United States Patent [19]

Morlotti et al.

[11] Patent Number: 5,540,947
[45] Date of Patent: Jul. 30, 1996

[54] X-RAY INTENSIFYING SCREENS AND METHOD OF MANUFACTURING THE SAME

[75] Inventors: Romano Morlotti, Varazze; Sergio Pizzini, Sesto Calende; Laura Oggioni, Milan, all of Italy

[73] Assignee: Minnesota Mining and Manufacturing Company, St. Paul, Minn.

[21] Appl. No.: 329,218

[22] Filed: Oct. 26, 1994

[30] Foreign Application Priority Data

Nov. 25, 1993 [EP] European Pat. Off. .............. 93118972

[51] Int. Cl.$^6$ ...................................................... B05D 5/06
[52] U.S. Cl. ......................... 427/65; 427/108; 427/126.2; 427/126.3; 427/160; 427/226; 427/314; 427/372.2; 427/379
[58] Field of Search ................................. 427/65, 126.2, 427/160, 126.3, 226, 314, 379, 108, 372.2

[56] References Cited

U.S. PATENT DOCUMENTS 3,785,413 12/1974 Taverner ..................................... 141/84

FOREIGN PATENT DOCUMENTS

| | | |
|---|---|---|
| 0249660A1 | 12/1987 | European Pat. Off. . |
| 0253589A1 | 1/1988 | European Pat. Off. . |
| 2816069 | 10/1978 | Germany . |
| 55-069687 | 5/1980 | Japan . |
| 56-005883 | 1/1981 | Japan . |

OTHER PUBLICATIONS

Kirk et. al., Journal of the Electrochemical Society, vol. 108, No. 5, "Transparent Luminescent Films by Solution Spraying," pp. 455–457, May, 1961.

*Primary Examiner*—Janyce Bell
*Attorney, Agent, or Firm*—Gary L. Griswold; Walter N. Kirn; Mark A. Litman

[57] ABSTRACT

An X-ray intensifying screen comprises a support and a layer containing a direct emission phosphor formed without a binder. The preferred direct emission phosphor is a rare earth silicate phosphor. Said X-ray intensifying screen is useful in the methods for recording and reproducing high energy radiation images. A process for the preparation of the binderless phosphor layer by reactive spray pyrolysis is also disclosed.

3 Claims, No Drawings

X-RAY INTENSIFYING SCREENS AND METHOD OF MANUFACTURING THE SAME

FIELD OF THE INVENTION

The present invention relates to X-ray intensifying screens and their preparation, and more in particular to binderless X-ray intensifying screens and their preparation by reactive spray pyrolysis.

BACKGROUND OF THE INVENTION

Some luminescent substances (phosphors), which comprise an inorganic compound (host) generally activated with elemental ions (activators), emit light (which is usually visible light but may be also infrared or UV radiation and is generally called soft or low energy radiation) upon exposure to hard or high energy radiation, such as X-rays, cathode rays, short UV rays.

The soft radiation emission may be either a direct emission, i.e. the phosphor emits light while it is still under irradiation (direct phosphor), or a photostimulated emission, i.e. the irradiated phosphor emits light if stimulated by a suitable stimulation light (stimulable phosphor).

Direct emission phosphors find application in intensifying screens for radiography in which the relevant luminescence of the phosphor is selected to be in the band of higher sensitivity of either a silver halide photographic film (direct radiography) or a photodetector (digital radiography) which are coupled to the phosphor screen for detecting the emitted light. The X-ray intensifying screen absorbs the X-rays and converts the X-rays, through luminescence, into light energy to which the photographic film or the photodetector are sensitive. Screens absorb a much larger fraction of X-rays than photographic films and photodetectors do and thus are used in order to reduce the X-ray dosage.

Among direct emission phosphors known in the art, the most efficient are generally considered the gadolinium oxy-sulfide phosphors activated with terbium ($Gd_2O_2S$:Tb), the barium fluoro-choride phosphors activated with europium (BaFCl:Eu), the calcium tungstate ($CaWO_4$), the yttrium tantalate phosphors activated with niobium ($YTaO_4$:Nb), the gadolinium tantalate phosphors activated with terbium($GaTaO_4$:Tb) and the rare earth silicate phosphors activated with terbium and/or cerium.

The X-ray intensifying screens are made of relatively thick layers of X-ray absorbing phosphors which convert X-rays into light energy. Generally, X-ray intensifying screens comprise a support having coated thereon a phosphor layer which comprises phosphor particles dispersed into a suitable binder in a phosphor-to-binder volume ratio between about 0.8/1 to about 4/1 and phosphor coverages between about 100 g/m$^2$ and about 2000 g/m$^2$, as described for example in Research Disclosure, vol. 184, item 18431, August 1979.

The efficiency of an X-ray intensifying screen (i.e., the absorption rate of radiation and the conversion rate to light) is essentially determined not only by the emission luminescence of the phosphor per se but also by the content of the phosphor in the phosphor layer, and consequently requires the layer to be very thick. The increased thickness of the phosphor layer results also in an increase of the image quality (reduced graininess). On the other hand, in the X-ray intensifying screens, the thicker the phosphor layer is, the less sharp the image tend to be due to the spread of emitted light. Thus, so far as the thickness of the layer containing the phosphor is concerned, the efficiency or graininess of the resulting image versus the sharpness of the resulting image present opposite requirements. Further, it is known that a high relative density (proportion by volume of the phosphor occupying the phosphor layer) can improve the efficiency/resolution characteristics of an X-ray intensifying screen. However, such improvement is typically limited in a powder phosphor layer by the intergrain volume (usually occupied by the organic binder), that is generally about 50 per cent of the overall layer volume. Further, when the phosphor layer having the binder contains a great number of air bubbles, the emitted light tends to scatter.

Dense binderless phosphor layers, with an intergrain volume near to zero, and thus having a relative density near to that of the bulk phosphor, appear to constitute the most convenient arrangement in X-ray intensifying screens.

Methods of increasing the relative density of a phosphor layer using binderless phosphor layers are known in the art. Said methods comprise 1) methods of compressing a phosphor layer using compression means such as a calendar roll or a hot press (U.S. Pat. No. 3,859,527), 2) methods in which the phosphor layer is formed by firing (JP 61-73100 and JP 59-196365), 3) sintering methods (EP253,348: stimulable phorphors), and 4) methods of forming a binderless phosphor layer in which said layer is deposited onto a support by sputtering, vacuum evaporation or chemical vapor deposition (EP 175,578 and EP 230,314: stimulable phosphors, and EP 322,715: activated ZnS or (Zn,Cd)S).

The above methods of manufacturing binderless phosphor layers, such as sintering, vacuum evaporation or sputtering, have not been found suitable for manufacturing binderless layers of direct emission phosphors, which have melting points higher than 1800° C. and low vapor tensions, such as rare earth oxysulfides, rare earth silicates and rare earth tantalates.

Further examples of methods of manufacturing binderless phosphor layers comprise 1) vacuum evaporation and subsequent heat treatment of ZnS(Mn), $Zn_2SiO_4$(Mn), $Zn_2(PO_4)_3$(Mn), $CaF_2$(Mn) and $CaWO_4$(W) phosphors (C. Feldman and M. O'Hara, J. Opt. Soc. Am., V. 47, p. 300–305, April 1957), 2) chemical vacuum deposition of activated ZnS (F. Studer and D. Cusano, J. Opt. Soc. Am., V. 45, p. 493–497, July 1955), 3) gelling techniques in systems containing CaO, MgO, $Al_2O_3$, $SiO_2$, Fe—$O_2$ and $Na_2O$ (G. Biggar and M. O'Hara, V. 37, p. 198–205, June 1969), 4) sol-gel techniques in terbium doped yttrium silicates (E. Rabinovich et al., Am. Ceram. Soc. Bull., V. 66, p. 1505–1509, 1987), 5) growth by liquid phase epitaxy of cerium activated yttrium aluminum oxide phophors (G. Berkstresser et al., J. Electrochem. Soc., V. 134, p. 2624–2628, October 1987), and 6) electron beam evaporation method for the synthesis of BaFBr:Eu phosphor film (H. Kobayashi et al., J. Lumines., V. 40/41, p. 819–820, 1988).

A solution spray pyrolysis technique has been described for preparation of very thin and transparent luminescent films of activated zinc and cadmium silicates (R. D. Kirk and J. H. Schulman, J. Electrochem. Soc., V. 108, p. 455–457, May 1961), Such methods, however, have been found to be not desirable nor convenient for manufacture of thick binderless layers of luminescent substances having the sensitivity and image sharpness required in X-ray intensifying screens, in particular those X-ray intensifying screens using rare earth activated rare earth silicate direct phosphors.

SUMMARY OF THE INVENTION

The present invention relates to an X-ray intensifying screen having a support and a layer of direct emission phosphor, wherein said layer comprising the direct emission phosphor is formed without a binder.

In addition, the present invention relates to a process for preparing an X-ray intensifying screen comprising a support and a binderless direct emission phosphor layer, wherein said phosphor layer is formed by reactive spray pyrolysis.

According to this invention, the relative density and the amount of light emission by irradiation to X-rays of the layer containing the direct emission phosphor are improved because of the absence of binder, as compared to a phosphor layer of the same thickness which is obtained by conventional coating processes. Hence, the sensitivity of the X-ray intensifying screen is more enhanced. The process also reduces air bubbles in the phosphor layer, resulting in a decrease of scattering of the emitted light, and detection efficiency of the emitted light is increased. Further, the thickness of the phosphor layer can be made smaller while maintaining the sensitivity of the screen to that of a conventional screen. The screen of this invention can thus provide an image of higher sharpness.

DETAILED DESCRIPTION OF THE INVENTION

In the present invention, the phosphor layer of the X-ray intensifying screen consists essentially of a direct emission phosphor, wherein said direct emission phosphor referes to a phosphor which, upon irradiation of high energy radiation (X-rays), emits a luminescence corresponding to the dose of the initial irradiation of said high energy radiation. From the viewpoint of practical use, the direct emission phosphor is desired to emit light in the wavelength of visible light and infrared radiation, preferably in the wavelength of 300–600 nm, When irradiated with X-rays.

As a direct emission phosphor for use in the present invention, rare earth silicates appear particularly useful. Rare earth silicates correspond to the formulas $Re_2SiO_5$ (i.e., rare earth oxyorthosilicates) and $Re_2Si_2O_7$ (i.e., rare earth disilicates) wherein Re represents at least one rare earth element comprising Sc, Y, La and the rare earth elements of the lanthanide series comprising the elements of atomic number 58-71 inclusive of the Group IIIA of the Periodic Table of the Elements. These and other rare earth silicates are described by J. Felsche in The Crystal Chemistry of the Rare-Earth Silicates, Structure and Bonding, V. 13, p. 99–104, Springer Verlag, 1973, by J. Reichardt et al., Cathodo- and Photoluminescence in Oxyorthosilicates of $X_1$ and $X_2$ Type: System $Y_{2-x}Gd_xSiO_5$:$Tb_{3+}$, Phys. Stat. Sol. (a), V. 119, p. 631–642, 1990, and in U.S. Pat. No. 4,928,017, U.S. Pat. No. 3,814,967, EP 391,153, DE 2,202,485, DE 3,303,166, FR 1,589,990, and GB 1,336,518. Particularly useful rare earth silicates for use in the present invention are those represented by the formula

$Y_{2-x}Gd_xSiO_{5a}$:Tb,bCe wherein $0 \leq x \leq 2$, $0 \leq a \leq 0,3$, $0 \leq b \leq 0.01$ and a+b=0.

Other direct emission phosphors for use in the present invention include: rare earth oxysulfide phosphors activated with terbium, as described in U.S. Pat. Nos. 3,418,246 and 3,705,704, and rare earth activated tantalate phosphors, as described in U.S. Pat. No. 4,225,653.

The X-ray intensifying screens of the present invention find application in a method of direct radiography for getting a visible image from an X-ray image of an object, said method comprising the steps of: a) causing an X-ray radiation to pass through the object, b) collecting the passed radiation on a phosphor screen capable of converting the radiation image into a light image and, c) collecting the light image onto a photographic film capable of being impressed by the light image, wherein the phosphor screen comprises a support and a layer of direct emission phosphor formed without a binder.

The X-ray intensifying screens of the present invention can be manufactured by a reactive spray pyrolysis process, which will be described in general; specific numerical values are given in the examples.

Reactive spray pyrolysis is a process for forming binderless phosphor layers in which compounds of the constituent phosphor layer to be manufactured are dissolved in aqueous alcoholic solutions which are subsequently sprayed onto a heated support using air or nitrogen as the atomizing gas. At relatively low temperatures (200°–600° C.) of the support, chemical reactions take place in which formation of the desired phosphor occurs concomitantly with the release of volatile chemical reactants. Neither the concentrations nor the volumes of the solutions appear to be critical. Normal glass or plastic atomizers can be used for spraying. This process of preparing binderless phosphor layers has advantages that include simplicity, low cost and simple equipment, ability to prepare phosphor layers over large areas and possibility of varying the luminescence properties and physical properties of the phosphor by varying the working temperatures (for example by providing further refiring or annealing at relatively higher temperatures).

In the case of X-ray intensifying screens comprising binderless phosphor layers of activated rare earth silicate phosphors, aqueous alcoholic solutions of rare earth compounds (such as rare earth nitrates or halides) are thoroughly mixed with tetraethoxysilane (TEOS) and sprayed onto the heated support as described above. Rare earth oxyorthosilicate phosphor layers are obtained that, after deposition onto the heated support, are subsequently annealed at temperatures in the range 1200°–1600° C. for obtaining crystalline modifications of the $X_1$ and $X_2$ type.

The thickness of the phosphor layer (layer of the phosphor deposited by reactive spray pyrolysis) varies depending upon the characteristics of the aimed X-ray intensifying screen and the type of phosphor. Generally, the thickness of the phosphor layer is within the range of from 20 to 1000 μm approximately, and preferably of from 30 to 500 μm.

In the X-ray intensifying screens of the present invention, the binderless phosphor layer is formed on a support. As supports, those materials that are infusible at deposition and additionally retiring or annealing temperatures can be employed. Examples of infusible supports include metal foils such as aluminum foil and aluminum alloy foil, metal sheets, glass sheets, monocrystalline Si sheets, $SiO_2$, $Al_2O_3$, corderite, steatite and other ceramic sheets. Particularly useful supports in the manufacturing process of the present invention are ceramic sheets of unactivated rare earth silicates like $Y_2SiO_5$. The surface of the supports is allowed to be not only flat but also matt for the purpose of improvement of adhesiveness of the direct emission phosphor to the support. Said matt surface may be a surface having either fine voids or protrusions. Such uneven surface may further improve the image sharpness.

Further, in the X-ray intensifying screens of the present invention a transparent protective layer for physically and chemically protecting the phosphor layer can be provided on the surface of the phosphor layer intended for exposure (on the side opposite the support). The protective layer may be provided on the phosphor layer by directly applying thereto a coating dispersion to form the protective layer thereon, or may be provided thereon by bonding thereto the protective layer formed beforehand. As the material of the protective layer, a conventional material for a protective layer such as nitrocellulose, cellulose acetate, ethylcellulose, polyester, polycarbonate, polyethylene terephthalate, polyethylene, nylon and the like can be used. The transparent protective layer preferably has thickness within the range of approximately 0.1 to 20 μm.

The present invention will be now illustrated in greater details by reference to the following examples.

EXAMPLE 1

General Procedure:

Ceramic $Y_2SiO_5$ discs, with a diameter of 22 mm and thickness of 2 mm, having a relative density near to 97% of that of the crystal ($X_2$ crystalline modification), were sand sprayed and washed in warm nitric acid and then with deionized water, and were then used as supports.

Sprayed samples, having a thickness ranging from 20 to 200 μm, were obtained from liquid solutions using the following compounds:

Tetraethoxysilane (TEOS) (>98%; Fluka)

$Y(NO_3)_3.4H_2O$ (99.99%; Aldrich)

$Gd(NO_3)_3.H_2O$ (99.99%; Aldrich)

$Tb(NO_3)_3.6H_2O$ (99.99%; Aldrich)

$Ce(NO_3)_3.6H_2O$ (99.99%; Aldrich)

Ethyl Alcohol (20% by vol.; Carlo Erba)

Ethylene Glycol (>99.5%; Fluka)

The solutions were sprayed onto the support heated at 460° C. by means of a commercial glass nozzle under an air flux of about 400 liters per hour. The temperature was then slowly increased until 900° C. (typically, at a rate of 50° C. per hour) and maintained at this temperature for some hours (from 2 to 20 hours), in these examples for 16 hours. Silicatic layers with the $X_2$ type crystalline modification were obtained in the case of $Y_2SiO_5$ and binary systems $Y_{2-x}Gd_xSiO_5$ with $x \leq 1.2$ by subsequent annealing of the samples, between 1200° C. and 1600° C., preferably at 1300° C.

Screen Sample 3 ($Y_{1.2}Gd_{0.8}SiO_5$:0.1Tb,0.001Ce):

A solution comprising:

TEOS 1.12 ml $Y(NO_3)_3.4H_2O$ 1.21 g $Gd(NO_3)_3.H_2O$ 2.60 g $Tb(NO_3)_3.6H_2O$ 0.226 g $Ce(NO_3)_3.6H_2O$ 0.00217 g

Ethyl Alcohol 8.0 ml

Ethylene Glycol to make 50 ml was sprayed onto a $Y_2SiO_5$ support (a disc with 22 mm diameter, 2 mm thickness, porosity of about 3% manufactured by 3M Ceramic Technology Center, 3M Company, U.S.A.), sand treated, washed for 3 minutes in a warm mixture of a concentrated solution of HCl and $HNO_3$ in a volume ratio of 3 to 1, washed with distilled water and heated at 460° C. during spraying. The solution was sprayed, until consumption, with a commercial glass nozzle using an air flux of 400 liters/hour. The temperature was increased till 900° C. at a rate of 50° C. per hour, and maintained at that temperature for 16 hours. The temperature was then increased at 1300° C. and maintained constant for 4 hours. The sample was then allowed to cool to room temperature.

The obtained sample comprised an opaque layer consisting of phosphor, with a thickness of about 120 μm, and a porosity of 10–15%. X-ray check showed the phosphor of sample 3 to crystallize in the $X_2$ type modification.

The following Table 1 reports the compositions of the phosphors of screen samples prepared by varying the amounts of $Y(NO_3)_3.4H_2O$ and $Gd(NO_3)_3.H_2O$ and following the above procedure.

TABLE 1

| Screen Sample | Phosphor |
| --- | --- |
| 1 | $Y_2SiO_5$:0.1Tb,0.001Ce |
| 2 | $Y_{1.6}Gd_{0.4}SiO_5$:0.1Tb,0.001Ce |
| 3 | $Y_{1.2}Gd_{0.8}SiO_5$:0.1Tb,0.001Ce |
| 4 | $Y_{0.8}Gd_{1.2}SiO_5$:0.1Tb,0.001Ce |
| 5 | $Y_{0.4}Gd_{1.6}SiO_5$:0.1Tb,0.001Ce |
| 6 | $Gd_2SiO_5$:0.1Tb,0.001Ce |

EXAMPLE 2

Screen samples of example 1 were irradiated at different kilovoltages by using a Machbett X-ray tube provided with a W cathode at 40 KVp and 70 KVp, respectively. The emitted luminescence was detected by a type 9635 EMI photomultiplier. The X-ray luminescence spectra of screen samples were characterized by a main green emission (both for $X_1$ and $X_2$ type crystalline modifications) in the spectral range of 540–560 nm and lower emissions in the ranges 475–510 and 575–610.

Table 3 reports efficiency measurements in terms of integrated overall luminescence in unitary time, efficiency of $Y_2SiO_5$:0.1Tb,0.001Ce at 40 KVp being put equal to 100 as a reference point.

TABLE 3

| Sample | Phosphor | Efficiency at 40 KVp | Efficiency at 75 KVp |
| --- | --- | --- | --- |
| 1 | $Y_2SiO_5$:0.1Tb,0.001Ce | 100 | 90 |
| 2 | $Y_{1.6}Gd_{0.4}SiO_5$:0.1Tb,0.001Ce | 117 | 131 |
| 3 | $Y_{1.2}Gd_{0.8}SiO_5$:0.1Tb,0.001Ce | 154 | 127 |
| 4 | $Y_{0.8}Gd_{1.2}SiO_5$:0.1Tb,0.001Ce | 108 | 117 |
| 5 | $Y_{0.4}Gd_{1.6}SiO_5$:0.1Tb,0.001Ce | 121 | 226 |
| 6 | $Gd_2SiO_5$:0.1Tb,0.001Ce | 110 | 189 |
| 7* | $Y_2SiO_5$:0.1Tb,0.001Ce | 60 | 42 |
| 8* | $Y_{1.2}Gd_{0.8}SiO_5$:0.1Tb,0.001Ce | 95 | 83 |

*= screen samples having a thickness of 40 μm.

Binderless screens having the thickness useful for direct X-ray radiography were obtained with the methods of the present invention.

EXAMPLE 3

A control sample A, having a layer of phosphor comprising a binder, was prepared according to the following procedure. 20 g of $Y_2SiO_5$:0.1Tb,0.001Ce, constituted by a powder having a medium grain size of 3.5 μm, prepared by a gelling technique according to the method described in U.S. Pat. No. 4,928,017, were mixed with 3 g of polymeric binders and 11.5 g of organic solvents. Coating was performed by a doctor blade method, directly on a disc of $Y_2SiO_5$ as a support. After evaporation of the solvent, the layer contained 0.0605 g of phosphor per square centimeter, a thickness of 250 μm, and a phosphor weight equivalent to the opaque binderless sample 1 of Example 2. Samples were irradiated at 70 KVp and efficiency was measured as described in Example 2. The results are shown in Table 3.

TABLE 3

| Sample | Efficiency |
|--------|------------|
| 1      | 100        |
| A      | 83         |

We claim:

1. A process for preparing an X-ray intensifying screen comprising a support and a layer containing a rare earth silicate direct emission phosphor but no binder in said layer, which process comprises the steps of spraying a solution comprising rare earth compounds and tetraethoxysilane which form the constituent phosphor onto a support, the support being heated to a temperature of 200° to 600° C. and refiring a layer formed from the solution on the support at a temperature in the range of 1200° to 1600° C.

2. The method of claim 1, wherein said direct emission phosphor corresponds to the formula $$Y_{2-x}Gd_xSiO_{5:a}Tb,bCe$$

wherein $0 \leq x \leq 2$, $0 \leq a \leq 0.3$, $0 \leq b < 0.01$ and $a+b=0$.

3. The process of claim 1 wherein the solution of comprises a solution of rare earth salts, and tetraethoxysilane.

* * * * *